United States Patent
Geerke et al.

(10) Patent No.: US 6,276,512 B1
(45) Date of Patent: Aug. 21, 2001

(54) METHODS AND APPARATUS FOR UNIFORMLY ORIENTING PHARMACEUTICAL DOSAGE FORMS

(75) Inventors: Johan H. Geerke, Los Altos; Antonio A. Crisologo, Sunnyvale, both of CA (US)

(73) Assignee: Alza Corporation, Mountain View, CA (US)

( * ) Notice: Subject to any disclaimer, the term of this patent is extended or adjusted under 35 U.S.C. 154(b) by 0 days.

(21) Appl. No.: 09/315,594

(22) Filed: May 20, 1999

(51) Int. Cl.$^7$ ..................... B65G 47/24
(52) U.S. Cl. ............. 198/395; 198/399; 198/408
(58) Field of Search ................. 198/395, 399, 198/404, 408; 193/47

(56) References Cited

U.S. PATENT DOCUMENTS

| | | | |
|---|---|---|---|
| 3,252,571 | * 5/1966 | Hinkle et al. | 198/395 |
| 3,537,567 | * 11/1970 | Nowicki | 198/399 |
| 3,817,423 | 6/1974 | McKnight | 221/173 |
| 3,917,055 | 11/1975 | VandenBerg et al. | 198/278 |
| 4,128,174 | * 12/1978 | Frisbie et al. | 198/408 |
| 4,353,456 | 10/1982 | Yamamoto | 198/397 |
| 4,372,437 | 2/1983 | Ackley et al. | 198/380 |
| 4,394,933 | 7/1983 | Ackley | 221/173 |
| 4,413,556 | 11/1983 | Ackley | 101/40 |
| 4,427,131 | 1/1984 | Facchini | 221/173 |
| 4,452,561 | * 6/1984 | Forte | 198/404 |
| 4,500,012 | 2/1985 | Ackley | 221/173 |
| 4,584,817 | 4/1986 | Yamamoto et al. | 53/329 |
| 4,645,400 | * 2/1987 | Mally et al. | 198/404 |
| 4,721,230 | 1/1988 | McKnight | 221/173 |
| 4,828,142 | 5/1989 | McKnight | 221/171 |
| 4,940,499 | 7/1990 | Lebrun et al. | 156/69 |
| 5,294,770 | 3/1994 | Riddle et al. | 219/121 |
| 5,399,828 | 3/1995 | Riddle et al. | 219/121.7 |
| 5,658,474 | 8/1997 | Geerke | 219/121.71 |
| 5,698,119 | 12/1997 | Geerke | 219/121.7 |

* cited by examiner

*Primary Examiner*—Joseph E. Valenza
(74) *Attorney, Agent, or Firm*—Paul B. Simboli; Steven F. Stone

(57) ABSTRACT

An inverter for reversing the orientation of a pharmaceutical dosage form at a discontinuity in a path of travel is described. The inverter receives dosage forms from an input path and delivers rectified dosage forms to an output path. In addition, a dosage form rectifier comprising an inverter is described. The dosage form rectifier receives randomly oriented dosage forms and delivers uniformly oriented dosage forms without recycling any of the dosage forms. In a repeating cycle for each dosage form supplied to the rectifier, the orientation of the dosage form is determined and dosage forms having a desired orientation are maintained in the desired orientation and delivered from the dosage form rectifier while dosage forms having an inverted orientation have their orientation rectified at the inverter before being delivered from the dosage form rectifier.

14 Claims, 5 Drawing Sheets

METHODS AND APPARATUS FOR UNIFORMLY ORIENTING PHARMACEUTICAL DOSAGE FORMS

CROSS-REFERENCE TO RELATED APPLICATIONS

None.

BACKGROUND OF THE INVENTION

1. Field of the Invention

This invention pertains to pharmaceutical manufacturing and particularly to supplying pharmaceutical dosage forms, such as medicinal tablets or capsules, uniformly oriented at a step in their manufacture. The dosage form rectifier of the present invention receives randomly oriented dosage forms, maintains or rectifies the orientation as appropriate and delivers uniformly oriented dosage forms.

2. Description of the Related Art Including Information Disclosed Under 37 CFR 1.97 and 1.98

Pharmaceutical dosage forms, e.g., tablets, capsules and the like are made and consumed in enormous quantities. Accordingly, specialists in the art of pharmaceutical manufacturing have made great investments in equipment for making, filling, closing, labeling, inspecting and packaging such dosage forms at high volume and with high efficiency. Also, in the interest of efficiency, many devices and methods have been developed for integrating the various processing steps and for transferring the dosage forms from station to station where the various processing steps occur. Certain processing steps including, for example, capsule filling, marking or printing, inspecting and packaging steps, generally require that the dosage forms be uniformly oriented at a particular processing station or location for that processing step. For example, it may be necessary to provide gel capsules oriented caps-up, caps-forward or caps all to one side or to provide tablets oriented edge-forward or lying flat, relative to a conveyor path supplying the dosage forms to a particular processing station. Preferably, the equipment for ensuring uniform orientation should be compact, reliable and efficient and should be readily integrable with other components of the processing system.

Pharmaceutical dosage forms generally are not shaped as perfect spheres or perfect cubes. Instead, dosage forms have physical geometries that can be discriminated to some extent for orientation purposes. For example, many tablets have a flattened or concave, round or oval shape or a flattened or concave, parallelogram shape such that the front and back surfaces are relatively broad and the surrounding edge surfaces are relatively narrow. Capsules or capsule-shaped tablets are also common and these have a larger length aspect and a smaller width or circumference aspect. For many processing steps, the orientation of dosage forms on the basis of the difference in geometric dimensions is sufficient and many mechanical devices for transporting and processing of dosage forms oriented on this basis are known. For example, conveyor paths and processing stations may be configured such that dosage forms may be transported or held only in a specific orientation such as lengthwise or edgewise.

Another type of dosage form, the two-part gel capsule filled with liquid or solid medicament, provides an additional physical aspect that may be exploited for purposes of orienting the dosage forms. Such gel capsules comprise a body and a cap that is somewhat wider than the body and that typically is telescoped onto, or otherwise affixed to, the body to close the capsule. Because the cap is slightly larger in circumference than the body, the cap end can be mechanically distinguished from the body end of the capsule and many devices have been developed for this purpose. These devices provide a variety of cavities, channels, fingers, brushes and the like which cooperate to sort or rotate the dosage forms in an orientation-specific manner, i.e., cap end versus body end. Friction or mechanical interference provides the basis for discriminating between the wider cap end and the narrower body end as, for example, where a path for tumbling or sliding is calibrated such that the body end, but not the cap end, will sink into a depression, or one end but not the other will tumble a certain way or one end is held back by friction.

The above-described devices for orienting dosage forms that rely on external physical dimensional differences are sufficient for processing of many dosage forms. A unique problem arises, however, when pharmaceutical dosage forms must be uniformly oriented for a particular processing step but external physical dimensional differences within the dosage forms are not sufficient to discriminate between proper and improper orientation.

For example, certain dosage forms must be oriented for certain processing steps with respect to an internal, i.e., formulation, non-symmetry wherein the dosage form contains formulation components that differ at different locations within or upon the dosage form. Examples of dosage forms exhibiting such formulation non-symmetry include multi-layered tablets having different ingredients in different layers such as a buffered aspirin product having aspirin in one layer and a buffering agent in another layer. Another example is multi-layer osmotic dosage forms having an internal compartment surrounded by a semipermeable membrane and having a delivery port formed through the semipermeable membrane. The internal compartment contains at least one drug-containing layer and at least one expandable polymer-containing layer. The expandable polymer-containing layer is known as a "push" layer because, following oral administration, fluid is imbibed through the semipermeable membrane causing the drug-containing layer to form a deliverable drug formulation and causing the polymer layer to expand and "push" the drug formulation through the delivery port. Such osmotic dosage forms are typically manufactured by compressing the component drug-containing layer(s) and the push layer(s) together to form a core, applying the semipermeable membrane around the core and then drilling, typically with a laser, an appropriate delivery port. The dosage form is non-symmetrical in that one or more portions contain the drug-containing layer(s) and one or more portions contain the push layer(s). Generally, the dosage form is configured to have a "push end" adjacent to a push layer and a "drug-release end" that is adjacent to a drug-containing layer or that will become adjacent to a drug-containing layer following fluid imbibition into the dosage form. The dosage form may be shaped in a variety of configurations including conventional tablet shapes wherein the layers are compressed transversely such that a broad front surface encompasses the drug-release end and the opposite broad back surface encompasses the push end. Certain dosage forms are preferably capsule-shaped and have the layers compressed longitudinally such that the drug-release end is at one narrow end of the capsule-shaped tablet and the push end is at the opposite narrow end of the capsule-shaped tablet. No matter what the dosage form shape, however, proper operation of the dosage form requires that the delivery port be formed in the drug-release end of the dosage form and not at the push end of the dosage form.

In view of the above, it will be appreciated that orienting the dosage forms merely with respect to physical dimensions is not sufficient for the laser drilling process, i.e., drilling must occur only at one of alternate but dimensionally identical surfaces such as the front or back surface of a conventional tablet-shaped dosage form or one or the other narrow and rounded ends of a capsule-shaped dosage form. Thus, while the dosage forms may be oriented dimensionally so that an appropriate dimensional "end" is presented for drilling, this orientation is random with respect to whether the end presented is actually the correct end for drilling of the delivery port, i.e., the drug-release end and not the push end of the dosage form.

One approach to this problem of orienting dosage forms with respect to an internal formulation non-symmetry uses a system wherein dosage forms are supplied in a manner that permits laser access to alternate surfaces of the dosage form, e.g., a front and a back surface of a conventional tablet-shaped dosage form. A suitable detector is used to determine which of the alternate surfaces is the proper surface for drilling, i.e., the drug-release end, and a laser controller directs the laser to drill the correct surface. Such methods and apparatus are disclosed and claimed in U.S. Pat. Nos. 5,658,474 and 5,698,119, owned by Alza Corporation, each of which is incorporated in its entirety by reference herein.

The above-described approach is especially useful for dosage forms wherein the surface of the dosage form that is desired to be drilled is relatively large and wherein the dosage forms can be securely transported in an attitude that provides laser access to the alternate surfaces. For example, osmotic dosage forms having a conventional tablet shape with relatively broad front and back surfaces and narrow edge surfaces can be positioned on edge and securely transported such that either the front or the back surfaces are accessible to the laser. Upon determining which of the surfaces is adjacent to the drug-containing layer within the core, typically by a color detector for detecting a colorant used in at least one layer within the core, the laser is directed to drill that surface. This approach has been shown to be unsatisfactory, however, for capsule-shaped osmotic dosage forms wherein the delivery port is desired to be drilled into the surface at one of the relatively small and rounded ends of the dosage forms because these dosage forms are difficult to securely transport in an attitude that would permit laser access to either of the small end surfaces.

Another approach to this problem, common to many known orienting devices, is to supply randomly oriented dosage forms but, upon determining whether the orientation is correct for drilling, drilling only the properly oriented dosage forms and rejecting and recycling the improperly oriented dosage forms. Eventually, as the recycled dosage forms are randomly oriented for each drill presentation cycle, the proper orientation for drilling will be obtained and the dosage forms will be drilled. This approach is relatively inefficient, however, as approximately half of the dosage forms presented in each randomly oriented drill presentation cycle will be improperly oriented and will require recycling.

Accordingly, it would be an advance in the art to provide methods and apparatus for receiving randomly oriented dosage forms, maintaining or rectifying the orientation as appropriate and delivering uniformly oriented dosage forms. It would be a particular advance to provide such methods and apparatus that do not rely on physical dimensional differences to rectify orientation and thus may be used to uniformly orient dosage forms when physical dimensional differences are insufficient for proper orientation. Such methods and apparatus would be useful and efficient for providing uniformly oriented dosage forms for various processing steps and would be especially useful for ensuring that pharmaceutical dosage forms having internal formulation non-symmetry are uniformly oriented for laser drilling. Additionally, it would be an advance to provide such methods and apparatus that are compact, reliable and efficient and that may be readily integrated with other components of a pharmaceutical dosage form processing system.

BRIEF SUMMARY OF THE INVENTION

One aspect of the present invention pertains to providing methods and apparatus for accepting randomly oriented dosage forms and providing uniformly oriented dosage forms. In particular, the present invention does not recycle improperly oriented dosage forms but maintains or rectifies the orientation of each dosage form as appropriate and is useful and efficient for providing uniformly oriented dosage forms for various processing steps.

In another aspect, the present invention pertains to providing methods and apparatus for uniformly orienting dosage forms that do not rely on physical dimensional differences to orient the dosage forms and thus may be used when such differences are insufficient for proper orientation. The present invention is especially useful for ensuring that pharmaceutical dosage forms that require proper orientation with respect to a formulation non-symmetry are uniformly oriented for a particular processing step such as laser-drilling.

Yet a further aspect of the present invention pertains to providing methods and apparatus for uniformly orienting dosage forms that are compact, reliable and efficient and that may be readily integrated with other components of a pharmaceutical dosage form processing system.

In accord with the above aspects, the dosage form rectifier of the present invention operates in a cycle wherein the rectifier receives randomly oriented dosage forms, maintains the orientation of dosage forms having a desired orientation and rectifies the orientation of dosage forms having an inverted orientation, and delivers all of the dosage forms uniformly oriented in the desired orientation. The dosage form rectifier of the present invention is associated with a supply path for supplying dosage forms having random orientation and a delivery path for delivering dosage forms having uniform orientation and comprises:

a diverter associated with said supply path, said diverter having a bypass position whereby dosage forms are directed from said supply path into a first path and having a diverting position whereby dosage forms are directed from said supply path into a second path, said first and second paths configured to transport dosage forms between said diverter and said delivery path, said first path being continuous between said diverter and said delivery path and said second path having a discontinuity such that an input portion is continuous with said diverter and an output portion is continuous with said delivery path;

an inverter associated with said discontinuity in said second path, said inverter having a pocket for carrying a dosage form and having pocket driving means for moving said pocket from an accepting position for accepting a dosage form from said input portion to a discharging position for discharging the dosage form into said output portion wherein the orientation of said pocket and of any dosage form therein inverts during movement of said pocket from said accepting position to said discharging position;

a detector for determining the orientation of a dosage form in the supply path; and directing means associated with said detector for positioning the diverter in the bypass position when the dosage form is determined to have a desired orientation and positioning the diverter in the diverting position when the dosage form is determined to have an inverted orientation, such that a dosage form directed into said first path has its orientation maintained and is delivered to said delivery path in said desired orientation and a dosage form directed into said second path has its orientation inverted and is delivered to said delivery path in said desired orientation.

The dosage form rectifier is best understood as operating in a repeating processing cycle wherein: 1) a dosage form is supplied in either the desired orientation or an inverted orientation, i.e., an orientation opposite to the desired orientation; 2) the orientation of the dosage form is detected and the dosage form is directed at the diverter into either the first path or the second path depending on its orientation, i.e., dosage forms having the desired orientation are directed into the first path and dosage forms having the inverted orientation are directed into the second path; and 3) the dosage form, if directed into the first path, is delivered to the delivery path with its orientation maintained in the desired orientation or, if directed into the second path, the dosage form has its orientation rectified, i.e., changed from the inverted to the desired orientation, at the inverter and is subsequently delivered to the delivery path in the desired orientation. In this manner, randomly oriented dosage forms supplied to the rectifier are delivered therefrom having uniform orientation and ready to be processed further at a processing step, e.g., laser drilling at a location adjacent to a drug-containing layer within the dosage form, that requires such uniform orientation.

It will be appreciated that the inverter can be operated to move the pocket from the accepting position to the discharging position only during those processing cycles when a dosage form in the supply path is directed into the second path of the rectifier. Alternatively, the inverter can operate in each processing cycle regardless of whether the dosage form travels the first path or the second path. To simplify the operation, the inverter is preferably operated during each processing cycle. In this manner, random stopping and starting of the inverter depending on the orientation of each dosage form that is supplied to the rectifier is avoided.

The dosage form rectifier is preferably integrated vertically into a processing system such that the supply path is above and the delivery path is below the rectifier. In this manner, gravity can be used to facilitate travel of the dosage forms through the rectifier.

For processing efficiency, it is preferred to configure a plurality of dosage form rectifier units into a compact linear array. With such an array of rectifier units, batches of dosage forms are efficiently uniformly oriented in accord with a batch processing cycle wherein the array of rectifier units is supplied with a plurality of randomly oriented dosage forms, each dosage form traverses one rectifier unit and thereby has its orientation maintained or rectified as appropriate, and the plurality of dosage forms is delivered from the array of rectifier units in uniform orientation.

A linear array of dosage form rectifier units as described above preferably shares one motor for rotating a common drive shaft operatively coupled to every inverter and every inverter in the array of rectifier units is concurrently operated during each batch processing cycle regardless of whether any of the dosage forms in the supply batch are diverted into a second path in any of the rectifier units. This continuous synchronous operating of all of the inverters using just one drive shaft and one motor is very efficient. Because the dosage forms in the supply paths for each of the rectifiers are randomly oriented, however, the diverters in each rectifier unit must operate independently to direct the dosage forms into the first path or the second path in each rectifier unit depending on whether the dosage form in each supply path has the desired orientation or an inverted orientation.

Also in accord with the present invention, a method for delivering uniformly oriented dosage forms to a delivery path from a supply of randomly oriented dosage forms is provided herein. The method comprises the steps of:

supplying randomly oriented dosage forms to a supply path for a dosage form rectifier, said rectifier comprising:

a diverter associated with said supply path, said diverter having a bypass path whereby dosage forms are directed into a first path and a diverting path whereby dosage forms are directed into a second path, said first and second paths configured to transport dosage forms to said delivery path, said first path being continuous with said delivery path and said second path having a discontinuity such that an input portion is continuous with said diverter and an output portion is continuous with said delivery path; and an inverter associated with said discontinuity in said second path, said inverter having a pocket for carrying a dosage form and having pocket driving means for moving said pocket from an accepting position for accepting a dosage form from said input portion to a discharging position for discharging the dosage form into said output portion wherein the orientation of a dosage form carried in said pocket inverts during movement of said pocket from said accepting position to said discharging position;

detecting the orientation of said dosage forms in said supply path;

positioning said diverter to direct said dosage form into said bypass path or said diverting path in accord with the orientation of said dosage form such that a dosage form having a desired orientation is directed into said first path and a dosage form having an inverted orientation is directed into said second path;

operating said inverter when a dosage form is directed into said second path; and, optionally, also when a dosage form is directed into said first path; and delivering uniformly oriented dosage forms to said delivery path, said dosage forms delivered to said delivery path from said first path wherein the dosage form orientation was maintained in said desired orientation or said dosage forms delivered to said delivery path from said second path wherein the dosage form orientation was inverted to said desired orientation.

It will be appreciated that, in accord with the methods of the present invention, randomly oriented dosage forms supplied to the rectifier are delivered therefrom having uniform orientation and ready to be processed further at a processing step, e.g., laser drilling at a location adjacent to a drug-containing layer within the dosage form, that requires such uniform orientation. As described above, it is preferred that the inverter is operated each time that a dosage form is supplied, i.e., even when the dosage form is directed into the first path at the diverter, to thereby avoid random stopping and starting of the pocket driving means of the inverter. In addition, it will be appreciated that the methods of the present invention include methods for processing batches of dosage forms through an array of rectifier units as described above to thereby delivery batches of uniformly oriented dosage forms for further processing steps.

The above-described features and advantages, as well as others, will become more apparent from the following detailed disclosure of the invention and the accompanying claims.

DETAILED DESCRIPTION OF THE INVENTION

The dosage form rectifier of the present invention is best understood as operating in a repeating processing cycle wherein: 1) a dosage form is supplied in either the desired orientation or an inverted orientation, i.e., an orientation opposite to the desired orientation; 2) the orientation of the dosage form is detected and the dosage form is directed into either a first path or a second path depending on its orientation; and 3) the dosage form, if directed into the first path, is delivered from the rectifier with its orientation maintained in the desired orientation or, if directed into the second path, has its orientation rectified, i.e., changed from the inverted to the desired orientation, and is subsequently delivered from the rectifier in the desired orientation. In this manner, randomly oriented dosage forms supplied to the rectifier are delivered therefrom having uniform orientation and ready to be processed further at a processing step that requires such uniform orientation. A particular process that is facilitated by the dosage form rectifier of the present invention is laser drilling of dosage forms at a location adjacent to a drug-containing layer within the dosage form that requires that the dosage forms be uniformly oriented with respect to that location within the dosage form when presented for laser drilling.

Figure 1:
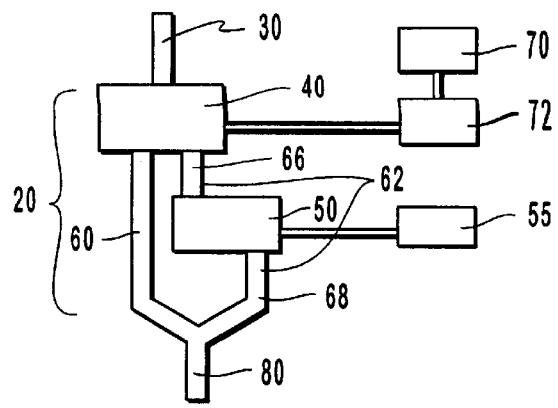
FIG. 1 is a schematic illustration of the alternate paths of travel for dosage forms through the dosage form rectifier in accord with the present invention.

With reference to the above-described processing cycle, FIG. 1 provides a schematic view illustrating the alternate paths of travel for dosage forms through the dosage form rectifier in accord with the present invention. As shown in FIG. 1, the rectifier 20 is associated with a supply path 30 and a delivery path 80 and comprises a diverter 40 (represented schematically as a box in this Figure), positioned between the supply path 30 and a first path 60 and a second path 62. At the diverter, dosage forms from the supply path are directed into one or the other of the first path and second path depending on their orientation in the supply path, as described in more detail below. A detector 70 for determining the orientation of the dosage form in the supply path is associated with directing means 72 for positioning the diverter in the appropriate position in accord with the detected orientation of the dosage form i.e., the diverter is positioned in a bypass position when the dosage form has the desired orientation, such that the dosage form travels the first path 60, and the diverter is positioned in a diverting position when the dosage form has an inverted orientation, such that the dosage form travels the second path 62.

As shown in FIG. 1, the first path 60 is continuous with the delivery path 80 but the second path 62 has a discontinuity such that an input portion 66 is continuous with the diverter 40 and an output portion 68 is continuous with the delivery path 80. The discontinuity is associated with an inverter 50 (represented schematically as a box in this Figure) for inverting the orientation of a dosage form that travels the second path 62. At the inverter, a dosage form is accepted from the input portion 66 of the second path and has its orientation inverted before it is discharged from the inverter into the output portion 68 of the second path. As described in more detail below and shown in FIG. 3, the inverter 50 comprises a pocket for carrying a dosage form and pocket driving means 55 (represented schematically as a box in this Figure) for moving the pocket from an accepting position for accepting a dosage form from the input portion 66 and a discharging position for discharging the dosage form into the output portion 68. Movement of the pocket from the accepting position to the discharging position inverts the orientation of the pocket and, thus, the orientation of the dosage form carried therein. All of the paths are configured to maintain the orientation of a dosage form therein such that dosage forms having the desired orientation in the supply path are directed into the first path at the diverter and delivered to the delivery path in the desired orientation and dosage forms having an inverted orientation in the supply path are directed into the second path, inverted at the inverter, and delivered to the delivery path in the desired orientation.

The detector 70 comprises any suitable known in the art means for determining whether the orientation of the dosage form in the supply path is the desired orientation for further processing or is an inverted orientation, i.e., opposite of the desired orientation for further processing. For example, dosage forms may be color-coded such that a specific color or the absence of color at one location on the dosage form can be used to determine the orientation of the dosage form. In this case, a color detector such as a color-sensitive photoelectric device can be used to determine the orientation of the dosage forms in the supply path. Another method that could be used for dosage forms having formulation non-symmetry would be a detector such as an infra-red (IR) detector that can identify the presence of a specific component of the formulation, such as the drug or an excipient, that is present at one location in the dosage form and, thus, can be used to determine the orientation of the dosage form. The detector is linked by appropriate logic and amplification devices to the directing means for positioning the diverter in either the bypass position or the diverting position in accord with the orientation of the dosage form as determined by the detector.

Figure 2A:
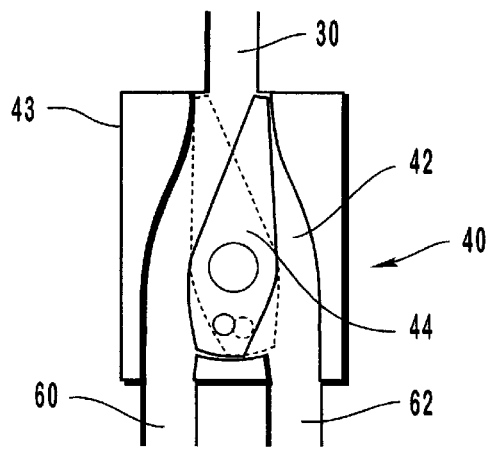
FIGS. 2A and 2B are partial diagrammatic views of alternative diverters in accord with the present invention.
Figure 2B:
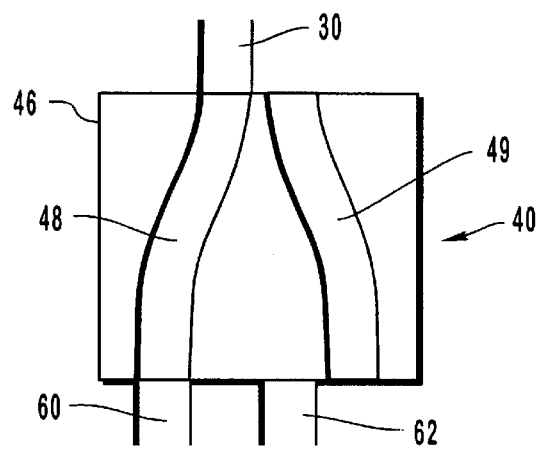

It will be appreciated that the diverter 40 may comprise any suitable structure for directing dosage forms between the supply path and one or the other of the first and second paths. FIGS. 2A and 2B illustrate partial diagrammatic views of alternative exemplary embodiments of a diverter 40 for directing dosage forms from the supply path 30 to one or the other of first path 60 and second path 62.

In FIG. 2A, the diverter 40 comprises a block 43 having a diverting chamber 42 formed therein and a pivotable guide 44 positioned within the diverting chamber 42. The pivotable guide 44 can be positioned in a bypass position (as shown) whereby dosage forms are directed from the supply path 30, through the diverting chamber and into the first path 60 or in a diverting position (shown in dotted lines) whereby dosage forms are directed from the supply path 30, through the diverting chamber and into the second path 62. The directing means 72 (FIG. 1) comprise suitable motive means (not shown) operatively coupled to pivotable guide 44 to effect movement of the pivotable guide into the appropriate position in accord with the orientation of the dosage form in the supply path.

In FIG. 2B, the diverter 40 comprises a movable block 46 having a bypass channel 48 and a diverting channel 49 formed therein for directing dosage forms from said supply path into the first path or the second path, respectively. The movable block 46 can be positioned in a bypass position (shown) whereby bypass channel 48 establishes a path from the supply path 30 to the first path 60. Alternatively, the block 46 can be moved horizontally to the diverting position (shown in FIG. 4B) whereby diverting channel 49 establishes a path from the supply path 30 to the second path 62. The directing means 72 (FIG. 1) comprise suitable motive means (not shown) operatively coupled to the movable block 46 to effect movement of the movable block into the appropriate position in accord with the orientation of the dosage form in the supply path.

Figure 3:
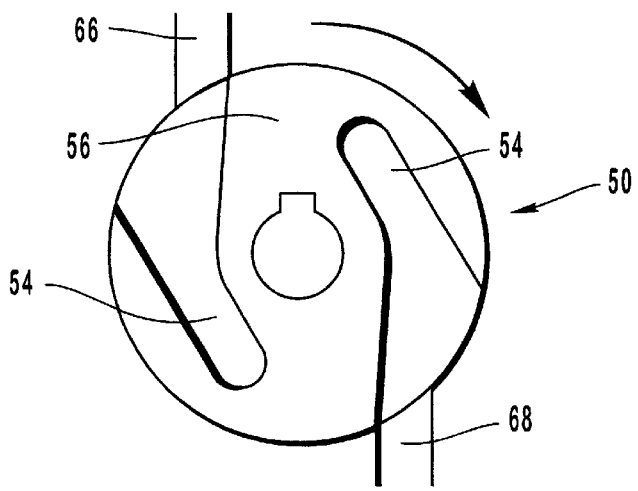
FIG. 3 is a partial diagrammatic view of an inverter in accord with the present invention.

FIG. 3 illustrates a partial diagrammatic view of a preferred embodiment of an inverter 50 for accepting dosage forms from the input portion 66 of the second path and for discharging dosage forms into the output portion 68 of the second path. As shown in FIG. 3, the inverter 50 preferably comprises two pockets 54 configured on a rotatable surface 56 (having an axis of rotation represented by the center notched circle) such that one pocket is positioned in the accepting position continuous with the input portion 66 of the second path when the other pocket is positioned in the discharging position continuous with the output portion 68 of the second path. The pocket driving means 55 (FIG. 1) comprise suitable motive means (not shown) operatively coupled to rotatable surface 56. In this manner, each half-turn rotation of the surface exchanges the positions of the pockets and ensures that a dosage form, if present, in the pocket in the accepting position has its orientation inverted and is discharged from that pocket at the same time that the other pocket rotates into the accepting position in readiness for the next processing cycle. It will be appreciated that, as illustrated, the surface is preferably rotated in a clockwise direction as indicated by the curved arrow above the surface. If desired, however, the configuration could be altered such that a counterclockwise rotation would be appropriate. It will also be appreciated that a surface having only one pocket could also be used provided that the surface was rotated, first, to discharge any dosage form from the pocket at the discharging position and, second, to return the pocket to the accepting position in readiness for another processing cycle.

The dosage form rectifier preferably comprises one or more compact components formed of sturdy and rigid machinable material such that the paths for dosage forms to traverse the rectifier can be machined to a suitable depth into one side surface thereof. Suitable materials are known in the art and include, for example, acrylics and other hard plastics such as acetyl copolymer resins (DELRIN II, product of Dupont; ULTRAFORM, product of BASF; and CELCON, product of Celanese) and various metal materials such as aluminum that is hard-anodized following machining. The dosage form rectifier is preferably integrated into a processing system with the supply path above and the delivery path below the rectifier such that gravity can be used to facilitate travel of the dosage forms through the rectifier. Alternatively, the dosage form rectifier can be integrated horizontally into a processing system and provided with suitable driving means for moving dosage forms through the rectifier.

Figure 4A:
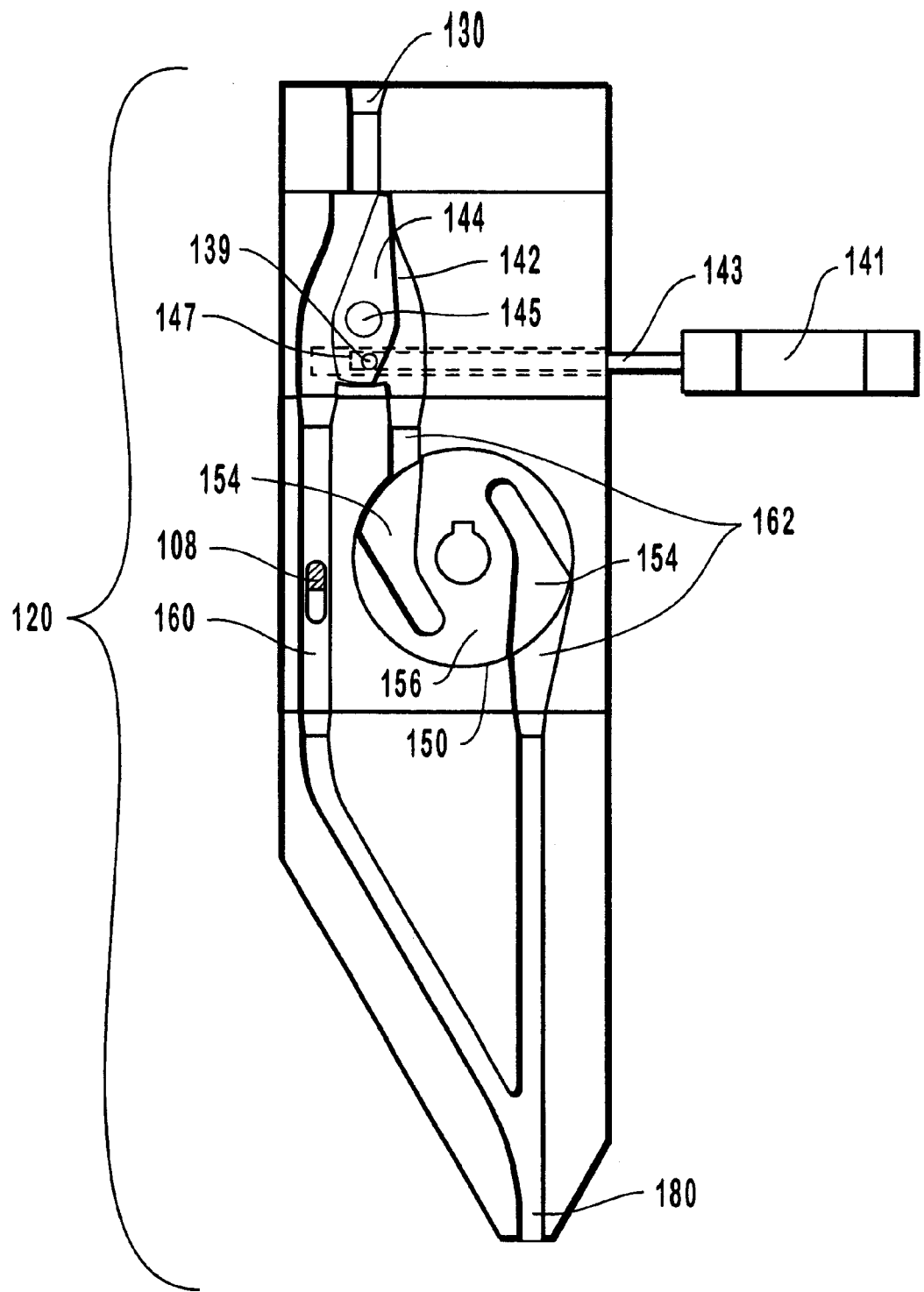
FIGS. 4A and 4B are front elevation partial diagrammatic views of preferred embodiments of a dosage form rectifier in accord with the present invention comprising the alternate diverters as shown in FIGS. 2A and 2B, respectively.
Figure 4B:
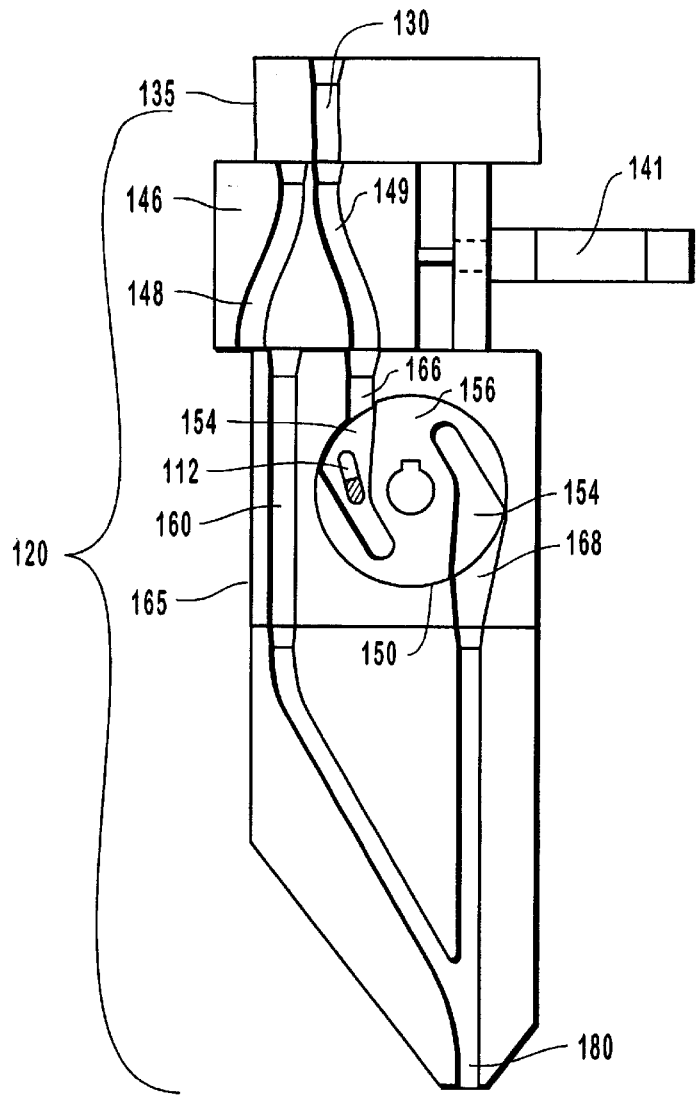

FIGS. 4A and 4B are front elevation views of a preferred embodiment of a dosage form rectifier in accord with the present invention comprising the alternate exemplary diverters described above with respect to FIGS. 2A and 2B, respectively. In each of FIGS. 4A and 4B, the dosage form rectifier comprises a block 120 having one or more component blocks and viewed from the front surface having the paths for the dosage forms to travel machined therein. In each of FIGS. 4A and 4B, the rectifier components are identical except for the diverters.

The common components of FIGS. 4A and 4B will first be described. In each of FIGS. 4A and 4B, the rectifier block 120 (or component blocks) is associated with a supply path 130 for supplying dosage forms to the rectifier and a delivery path 180 for delivering dosage forms from said rectifier. The supply path preferably provides dosage forms at the top of the rectifier and the delivery path collects dosage forms at the bottom of the rectifier. Each rectifier has a first path 160 continuous with the delivery path 180 and a second path 162 (FIG. 4A) having a discontinuity with the delivery path 180. Associated with each discontinuity, is the inverting chamber 150 (best shown in FIG. 5) comprising a rotatable surface 156 having two pockets 154 configured thereon such that one pocket is positioned in the accepting position continuous with the input portion 166 (FIG. 4B) of the second path when the other pocket is positioned in the discharging position continuous with the output portion 168 (FIG. 4B) of the second path as described above with respect to FIG. 3. The detector for determining the orientation of a dosage form in the supply path, the directing means for positioning the diverter in accord with the orientation of the dosage form in the supply path and the pocket driving means are not shown.

Turning now to FIG. 4A, block 120 (or a component block thereof is machined to define a diverting chamber 142 (FIG. 4A) that is continuous with the supply path 130 and both the first path 160 and the second path 162. The diverting chamber 142 contains a pivotable guide 144 movable about a pivot pin 145 between a bypass position (shown) and a diverting position for directing dosage forms from the supply path into the first or second paths, respectively, as described above with respect to FIG. 2A. The rectifier block 120 has a plunger bore (dotted lines) machined therethrough passing horizontally behind and slightly below pivot pin 145. A plunger 143 is movably disposed within the plunger bore and a linkage window is provided to permit the plunger to be linked to the tail portion 147 of the pivotable guide 144 below the pivot pin 145 via a linkage pin 139 projecting into the linkage window and fitted into a linkage bore formed in the tail portion. The linkage pin 139 fits the linkage bore loosely enough to accommodate the linear horizontal travel of the plunger within the plunger bore to the slightly arcuate travel of the tail portion 147 of the pivotable guide 144. In this manner, horizontal movement of the plunger 143 effects pivoting of the pivotable guide between the bypass and the diverting positions. Movement of the plunger is effected by a suitable drive mechanism (represented by box 141) operatively coupled to plunger 143. Suitable drive mechanisms are well-known in the art and include, for example, a solenoid or a pneumatic piston. The drive mechanism is controlled by the directing means (not shown) in accord with the orientation of the dosage form in the supply path, i.e., when the dosage form has the desired orientation, the pivotable guide is moved into the bypass position and when the dosage form has an inverted orientation, the pivotable guide is moved into the diverting position.

Turning now to FIG. 4B, the diverter may comprise a movable block 146 machined to define a bypass channel 148 and a diverting channel 149 for directing dosage forms from said supply path into the first path or the second path, respectively, as shown in FIG. 2B. As seen in FIG. 4B, when the diverting channel 149 is aligned with the supply path 130, a continuous path to the input portion 166 of the second path is provided. Movement of block 146 to align the bypass channel 148 with the supply path 130, on the other hand, will create a continuous path to the first path 160. The movable block 146 defines a component block to rectifier block 120 and is preferably positioned between an upper block 135 having the supply path machined therein and at least one lower block 165 having the beginnings of the first and second paths machined therein. The movable block 146 is horizontally slidable between the upper block 135 and the lower block 165 to thereby align one of the channels therein to direct dosage forms from said supply path to one of the first or second paths. Movement of the movable block 146 is effected by a suitable drive mechanism (represented by box 141) operatively coupled to one side of the movable block 146. Suitable drive mechanisms are described above. The drive mechanism is controlled by the directing means in accord with the orientation of the dosage form in the supply path as described above.

It will be appreciated that the paths and pockets for passing and carrying the dosage forms are configured for a dosage form of known physical dimensions and are adapted to maintain the orientation of the dosage forms therein. It will be further appreciated that the dosage form rectifier can be adapted to accommodate any type and shape of dosage form. In the exemplary embodiments illustrated herein, the dosage form contemplated is a multi-layer osmotic longitudinally-compressed capsule-shaped tablet having a formulation non-symmetry wherein the tablet has a push end and a drug-release end and requires a delivery port to be formed in the drug-release end.

As shown in FIGS. 4A and 4B, such an exemplary longitudinally-compressed capsule-shaped tablet is traveling through each of the dosage form rectifiers in accord with the tablet orientation. In FIG. 4A, a properly oriented tablet 108 having the cross-hatched portion oriented upward has been directed into the first path 160 at the diverter for travel to the delivery path 180 in the proper orientation. In FIG. 4B, an improperly oriented tablet 112 having the cross-hatched portion oriented downward has been directed into the input portion 166 of the second path at the diverter and has traveled to the pocket 154 of the inverter located in the accepting position. It can be seen that, upon clockwise one-half rotation of the surface, the pocket and the improperly oriented tablet 112 therein will become inverted such that the tablet will be delivered to the output portion 168 of the second path for passage to the delivery path 180 in the proper orientation. Accordingly, each tablet that passes through a dosage form rectifier in accord with the present invention enters the delivery path in the proper orientation, via either the first path (as shown in FIG. 4A) or the second path (as shown in FIG. 4B). Accordingly, each tablet that passes through the dosage form rectifier to the delivery path is ready to be transported to a processing station that requires uniformly oriented dosage forms such as a drilling station for drilling a delivery port into the drug-release end of the dosage form.

In a presently preferred embodiment, the block 120 is made of acrylic and has a height (from top to bottom) of approximately 28 cm, a width (from the side adjacent to the first path to the side adjacent to the second path) of approximately 7 cm and a thickness (between the machined front surface and non-machined back surface) of approximately 2 cm. The paths generally are approximately 0.5 cm deep and 0.5 cm wide throughout. The diverting chamber (FIG. 4A) is approximately 5 cm in height with a width varying from approximately 2 cm where it communicates with the supply path to approximately 3 cm where it communicates with the first and second paths. The pivotable guide has a thickness of about 0.5 cm, a narrow top extending to approximately 3 cm above the pivot pin and to within 2 mm of the top of the diverting chamber and a wider tail extending down to approximately 1.5 cm below the pivot pin and to within 2 mm of the bottom of the diverting channel. The pockets are generally approximately 0.5 cm deep and 0.5 cm wide with one closed end and one open end that is slightly widened and angled to facilitate easy transfer of dosage forms from the input portion and into the output portion of the second path even when the alignment is slightly imprecise. The input portion and the output portion are also preferably contoured to be slightly widened to approximately 0.8 cm at the point of communication with the pockets. The machined surface is preferably closed such that inadvertent ejection of dosage forms is prevented and the potential for contamination or interference from matter within the external environment is minimized. A separate cover (not shown) for fitting over the machined surface can be provided for this purpose. The block 120 is preferably compact in size and contoured to closely accommodate the paths machined therein.

Figure 5:
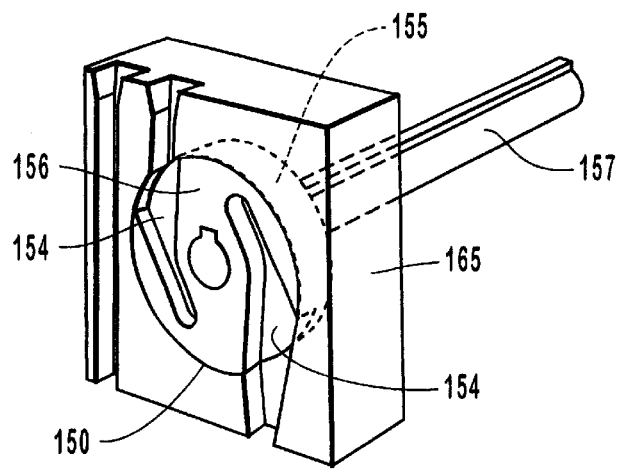
FIG. 5 is an exploded partial perspective view of the inverting chamber of a preferred embodiment of the dosage form rectifier.

FIG. 5 is an exploded partial perspective view of the lower block 165 of FIG. 4B having an inverting chamber in accord with a preferred embodiment of the dosage form rectifier of the present invention. The inverting chamber 150 preferably defines a cylindrical opening machined completely through the block and having a diameter of approximately 6 cm. A cylindrical body 155 (internal portions shown in dotted lines) is preferably rotatably positioned within the cylindrical opening to provide the rotatable surface 156 having two pockets 154 formed thereon. The cylindrical body 155 is configured to fit snugly yet slidably within the cylindrical opening. A drive shaft 157 (internal portions in dotted lines) is preferably disposed through the cylindrical body 155 to be coaxial with the axis of rotation. The drive shaft is operatively coupled to the cylindrical body such that rotation of the drive shaft 157 imparts rotation to the rotatable surface 156 and the two pockets 154 formed thereon. Suitable connecting means and methods are well-known to skilled persons and include pins or screws or adaptation of the components to have a keyed collar mechanism or to be press-fit together. Rotation of the drive shaft 157 is effected by a suitable drive mechanism (not shown) operatively coupled thereto. The pocket driving means can comprise any suitable motive device for imparting the desired rotating movement such that the pocket, and any dosage form accepted therein, is inverted during the movement from the accepting position to the discharging position. Known in the art driving means such as solenoids and pneumatic pistons, as described above, may be used. It is preferred that the driving means have a clutch mechanism for engaging and disengaging the driving means such that a cycle can be obtained wherein the pocket remains stationary in the accepting position in between periods of motion between the accepting position and the discharging position.

It will be appreciated that the inverter can be operated to move the pocket from the accepting position to the discharging position only during those processing cycles when a dosage form in the supply path is directed into the second path of the rectifier. Alternatively, the inverter can operate in each processing cycle regardless of whether the dosage form travels the first path or the second path. To simplify the operation, the inverter is preferably operated during each processing cycle. In this manner, random stopping and starting of the inverter depending on the orientation of each dosage form that is supplied to the rectifier is avoided.

Figure 6:
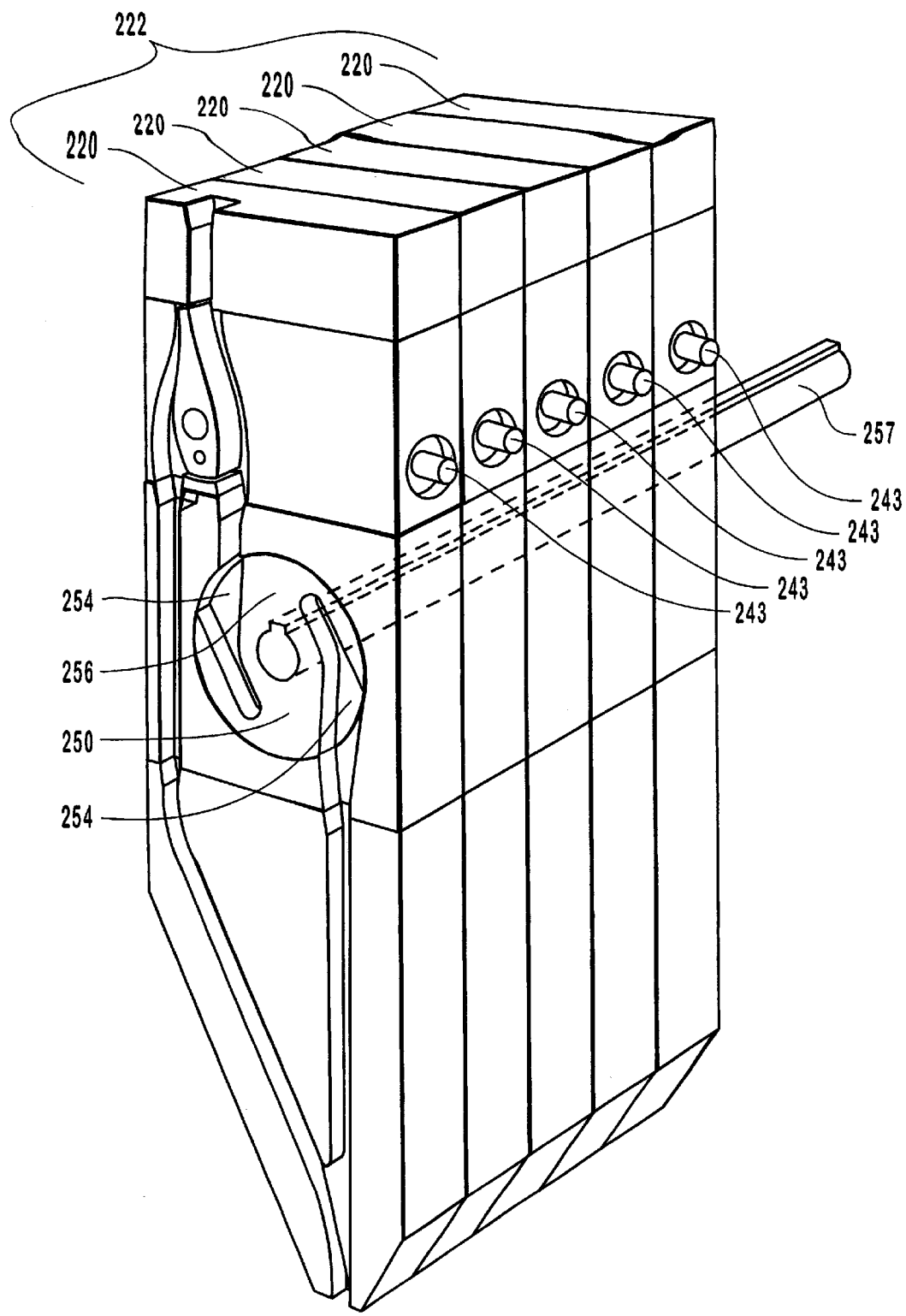
FIG. 6 is a partial perspective view of a preferred embodiment of an array of dosage form rectifier units in accord with the present invention.

FIG. 6 is a partial perspective view of a preferred embodiment of an array of dosage form rectifier units in accord with the present invention. For processing efficiency, it is preferred to configure a plurality of dosage form rectifier units into a compact linear array. With such an array of rectifier units, batches of dosage forms are efficiently uniformly oriented in accord with a batch processing cycle wherein the array of rectifier units is supplied with a plurality of randomly oriented dosage forms, each dosage form traverses one rectifier unit and thereby has its orientation maintained or rectified as appropriate, and the plurality of dosage forms is delivered from the array of rectifier units in uniform orientation. As shown in FIG. 6, it is preferred to configure a plurality of dosage form rectifier units 220 in side-by-side alignment to permit the non-machined back surface of each rectifier unit to cover and close the machined front surface of an adjacent rectifier unit such that only the endmost rectifier requires a separate cover (not shown) to enclose the machined paths traveled by the dosage forms. Each rectifier unit in the linear array 222 has an inverting chamber 250 defining a cylindrical opening machined completely through each rectifier unit and having a cylindrical body (as shown in FIG. 5) rotatably positioned therein to provide the rotatable surface 256 having two pockets 254 formed thereon as described above with reference to FIG. 5.

It will be appreciated that, due to the linear alignment of the rectifier units, a common drive shaft 257 can be disposed through each cylindrical body in the array to be coaxial with the common axis of rotation. The drive shaft is coupled to each cylindrical body such that rotation of the common drive shaft 257 imparts rotation to the rotatable surfaces and pockets concurrently in every rectifier unit. Rotation of the common drive shaft 257 is effected by a single drive mechanism (not shown) operatively coupled thereto such that every inverter in the array of rectifier units is concurrently operated during each batch processing cycle regardless of whether any of the dosage forms in the supply batch are diverted into a second path in any of the rectifier units. This continuous synchronous operating of all of the inverters using just one drive shaft and one motor is very efficient.

Because the dosage forms in the supply paths for each of the rectifiers are randomly oriented, however, the diverters in each rectifier unit must operate independently to direct the dosage forms into the first path or the second path in each rectifier unit depending on whether the dosage form in each supply path has the desired orientation or an inverted orientation. Accordingly, each rectifier unit is shown with a plunger 243 for moving the pivotable guide 244 of the diverter (as described with respect to FIG. 4A). Each plunger is operatively coupled to a suitable motive device (not shown) as described with respect to FIG. 4A. It will be appreciated that rectifier units comprising the alternate exemplary embodiment of a diverter as shown in FIG. 4B could also be used in an array as shown in FIG. 6.

Figure 7:
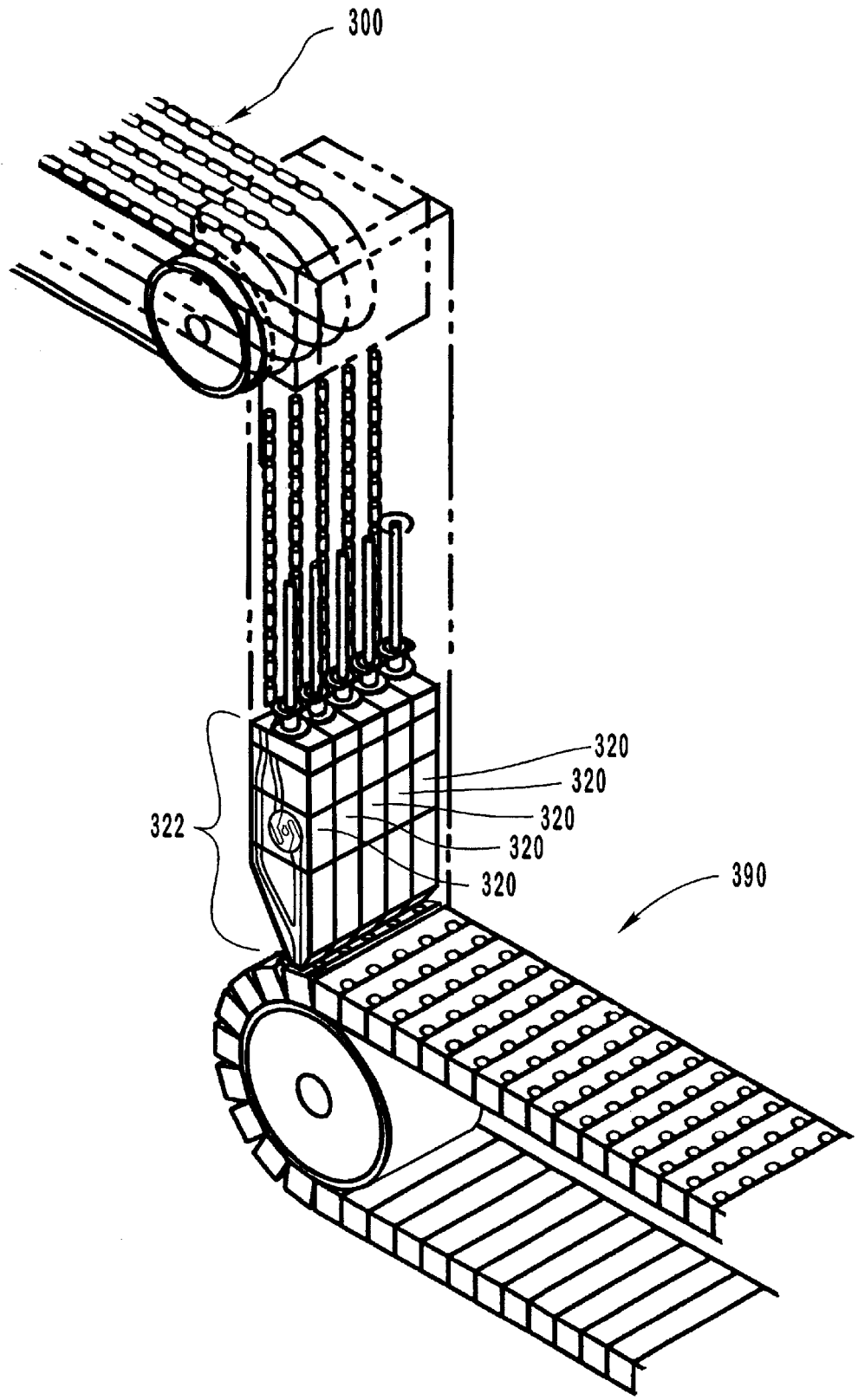
FIG. 7 is a partial perspective view of an array of dosage from rectifier units in arrangement with a batch supply conveyor and a batch delivery conveyor of a pharmaceutical dosage form processing system.

FIG. 7 is a partial perspective view of an array of dosage from rectifier units as shown in FIG. 6 positioned in arrangement with a batch supply conveyor and a batch delivery conveyor of selected portions of a pharmaceutical dosage form processing system. The array 322 of a plurality of dosage form rectifier units 320 is integrated with a supply conveyor 300 positioned above the array and a delivery conveyor 390 positioned below the array. The detector for determining the orientation of a dosage form in the supply path, the directing means for positioning the diverter in accord with the orientation of the dosage form in the supply path and the pocket driving means are not shown in this Figure. The supply conveyor 300 advances by segments and is configured such that each segment advance supplies one dosage form to each rectifier 320. Similarly, the delivery conveyor 390 advances by segments and is configured such that each advance collects one dosage form delivered from each rectifier 320. The delivery conveyor collects uniformly oriented dosage forms delivered from the array 322 and conveys these to a processing station that requires uniformly oriented dosage forms. For example, the uniformly oriented dosage forms may be loaded into appropriate carriers to be held securely in an appropriate attitude, i.e., drug-release end facing upward, and transported to a laser-drilling station for drilling of drug delivery ports, as described in detail elsewhere in this specification.

The method of operation wherein the array of rectifier units is used to uniformly orient dosage forms in accord with a batch processing cycle wherein the array of rectifier units is supplied with a plurality of randomly oriented dosage forms, each dosage form traverses one rectifier unit and thereby has its orientation maintained or rectified as appropriate, and the plurality of dosage forms is delivered from the array of rectifier units in uniform orientation is now described. Dosage forms are supplied in a uniform geometric orientation, i.e., with respect to height and width, such that all the dosage forms have one "end" up and another "end" down, however, assuming an internal formulation difference between which end is the proper end to be oriented either up or down, the dosage forms are randomly oriented. The orientation of each dosage form being supplied to the array of rectifier units is determined with respect to whether the proper end is up, i.e., whether the dosage form has the desired orientation or an inverted orientation, by a suitable detector (not shown) and an appropriate signal is sent to the associated directing means (not shown) to direct the positioning of each diverter such that the dosage forms that have the desired orientation are directed into the first path in each rectifier unit and the dosage forms having an inverted orientation are directed into the second path in each rectifier. The inverters within the array are concurrently operated to invert any dosage forms that have been directed into the second paths and thereby into the inverters. Accordingly, the dosage forms that entered the first paths are delivered from the array in the desired orientation and the dosage forms that entered the second paths are delivered from the array in the desired orientation. The uniformly oriented dosage forms can be collected from the delivery paths and transported for further processing requiring such uniform orientation, e.g., laser drilling at a drug-release end of a multi-layer osmotic dosage form.

While there has been described and pointed out features and advantages of the invention, as applied to present embodiments, those skilled in the art will appreciate that various modifications, changes, additions, and omissions in the descriptions within the specification can be made without departing from the spirit of the invention.

We claim:

1. A dosage form rectifier associated with a supply path for supplying dosage forms having random orientation and a delivery path for delivering dosage forms having uniform orientation, the rectifier comprising:

a diverter associated with said supply path, said diverter having a bypass position whereby dosage forms are directed from said supply path into a first path and having a diverting position whereby dosage forms are directed from said supply path into a second path, said first and second paths configured to transport dosage forms between said diverter and said delivery path, said first path being continuous between said diverter and said delivery path and said second path having a discontinuity such that an input portion is continuous with said diverter and an output portion is continuous with said delivery path;

an inverter associated with said discontinuity in said second path, said inverter having a pocket for carrying a dosage form and having pocket driving means for moving said pocket from an accepting position for accepting a dosage form from said input portion to a discharging position for discharging the dosage form into said output portion wherein the orientation of said pocket and of any dosage form therein inverts during movement of said pocket from said accepting position to said discharging position;

a detector for determining the orientation of a dosage form in the supply path; and directing means associated with said detector for positioning the diverter in the bypass position when the dosage form is determined to have a desired orientation and positioning the diverter in the diverting position when the dosage form is determined to have an inverted orientation, such that a dosage form directed into said first path has its orientation maintained and is delivered to said delivery path in said desired orientation and a dosage form directed into said second path has its orientation inverted and is delivered to said delivery path in said desired orientation.

2. The dosage form rectifier described in claim 1 wherein the movable pocket is moved from the accepting position to the discharging position each time a dosage form is supplied to the rectifier.

3. The dosage form rectifier described in claim 1 wherein said inverter comprises a surface connected to a drive shaft coaxial with an axis of rotation for said surface and said surface forming two movable pockets configured such that when one pocket is in the accepting position the other pocket is in the discharging position and wherein said pocket driving means is operatively coupled to said drive shaft for effecting rotation of said surface about said axis, each one-half rotation exchanging the positions of the pockets between the accepting position and the discharging position.

4. The dosage form rectifier described in claim 1 wherein the diverter comprises a channel with a pivotable guide therein.

5. The dosage form rectifier described in claim 1 wherein the diverter comprises a movable block having a bypass path and a diverting path formed therein.

6. The dosage form rectifier described in claim 1 wherein the supply path is located above said rectifier and said delivery path is located below said rectifier.

7. A dosage form rectifier assembly associated with a plurality of supply paths for supplying batches of dosage forms having random orientation and a plurality of delivery paths for delivering batches of dosage forms having uniform orientation, the rectifier assembly comprising:

a plurality of dosage form rectifier units arranged side-by-side in an array between said supply paths and said delivery paths, each rectifier unit configured to have a transport surface and a closed surface and aligned such that the closed surface of one rectifier unit aligns with and closes the transport surface of a next rectifier unit to thereby form the array with the transport surface of one rectifier unit on one end and a closed surface of another end rectifier unit at the other end, said array further comprising a cover for closing said transport surface of said one rectifier unit on one end, each rectifier unit within said array comprising:

a diverter, each diverter associated with one supply path and one delivery path and each diverter having a bypass position whereby a dosage form is directed from said supply path into a first path and having a diverting position whereby a dosage form is directed from said supply path into a second path, said first and second paths configured to transport dosage forms between said diverter and said delivery path, said first path being continuous between said diverter and said delivery path and said second path having a discontinuity such that an input portion is continuous with said diverter and an output portion is continuous with said delivery path;

an inverter associated with said discontinuity in said second path, said inverter having a pocket for carrying a dosage form and having pocket driving means for moving said pocket from an accepting position for accepting a dosage form from said input portion to a discharging position for discharging the dosage form into said output portion wherein the orientation of said pocket and of any dosage form therein inverts during movement of said pocket from said accepting position to said discharging position;

a detector for determining the orientation of a dosage form in the supply path for each rectifier; and directing means associated with said detector for positioning the diverter in the bypass position when the dosage form is determined to have a desired orientation and positioning the diverter in the diverting position when the dosage form is determined to have an inverted orientation, such that, within each rectifier unit in the array, a dosage form directed into said first path has its orientation maintained and is delivered to said delivery path in said desired orientation and a dosage form directed into said second path has its orientation inverted and is delivered to said delivery path in said desired orientation.

8. The dosage form rectifier assembly described in claim 7 wherein the plurality of inverters comprise a plurality of movable pockets and each movable pocket moves from the accepting position to the discharging position each time a dosage form is supplied to the rectifier.

9. The dosage form rectifier assembly described in claim 7 wherein the plurality of inverters in said array of rectifier units comprise a plurality of surfaces, one surface in each inverter, said surfaces connected to a common drive shaft, said common drive shaft defining an axis of rotation for said surfaces, each said surface forming two movable pockets configured such that when one pocket is in the accepting position the other pocket is in the discharging position and wherein said pocket driving means is operatively coupled to said common drive shaft for effecting rotation of said surfaces about said axis, each one-half rotation concurrently effecting exchange of the positions of the pockets between the accepting position and the discharging position.

10. The dosage form rectifier assembly described in claim 7 wherein each diverter within said array of rectifier units comprises a channel with a pivotable guide therein and wherein each said directing means comprises a pivoting mechanism operatively coupled to said guide to effect movement between said bypass position wherein said guide is positioned to direct dosage forms from said supply path to said first path and said diverting position wherein said guide is positioned to direct dosage forms from said supply path to said second path.

11. The dosage form rectifier assembly described in claim 7 wherein each diverter within said array of rectifier units comprises a movable block having a bypass path and a diverting path formed therein and each said directing means comprises a block driving mechanism operatively coupled to said block to effect movement between said bypass position wherein said bypass path is positioned to direct dosage forms from said supply path to said first path and said diverting position wherein said diverting path is positioned to direct dosage forms from said supply path to said second path.

12. The dosage form rectifier assembly described in claim 7 wherein the plurality of supply paths are located above the rectifier assembly and the plurality of delivery paths are located below the rectifier assembly.

13. A method for delivering uniformly oriented dosage forms to a delivery path from a supply of randomly oriented dosage forms, said method comprising the steps of:

supplying randomly oriented dosage forms to a supply path for a dosage form rectifier, said rectifier comprising:

a diverter associated with said supply path, said diverter having a bypass path whereby dosage forms are directed into a first path and a diverting path whereby dosage forms are directed into a second path, said first and second paths configured to transport dosage forms to said delivery path, said first path being continuous with said delivery path and said second path having a discontinuity such that an input portion is continuous with said diverter and an output portion is continuous with said delivery path; and an inverter associated with said discontinuity in said second path, the inverter having a pocket movable from an accepting position for accepting a dosage form from said input portion to a discharging position for discharging a dosage form into said output portion and having pocket driving means for moving the pocket from the accepting position to the discharging position, wherein said pocket is adapted to hold a dosage form therein during movement of the pocket from said accepting position to said discharging position and said movement is adapted to effect inverting of the orientation of a dosage form in said pocket during said movement;

detecting the orientation of said dosage forms in said supply path;

positioning said diverter to direct said dosage form into said bypass path or said diverting path in accord with the orientation of said dosage form such that a dosage form having a desired orientation is directed into said first path and a dosage form having an inverted orientation is directed into said second path;

operating said inverter when a dosage form is directed into said second path; and delivering uniformly oriented dosage forms to said delivery path, said dosage forms delivered to said delivery path from said first path wherein the dosage form orientation was maintained in said desired orientation or said dosage forms delivered to said delivery path from said second path wherein the dosage form orientation was inverted to said desired orientation.

14. The method for delivering uniformly oriented dosage forms to a delivery path from a supply of randomly oriented dosage forms described in claim 13 further comprising the step of operating said inverter when a dosage form is directed into said first path.

* * * * *